United States Patent
McGill

(10) Patent No.: US 8,137,104 B1
(45) Date of Patent: Mar. 20, 2012

(54) GAME OF CHANCE AND STRATEGY PERTAINING TO EMERGENCY PREPAREDNESS

(75) Inventor: Mary Christina McGill, Arcadia, MO (US)

(73) Assignee: Mary Christina McGill, Arcadia, MA (US)

( * ) Notice: Subject to any disclaimer, the term of this patent is extended or adjusted under 35 U.S.C. 154(b) by 0 days.

(21) Appl. No.: 12/460,109

(22) Filed: Jul. 13, 2009

Related U.S. Application Data

(60) Provisional application No. 61/135,327, filed on Jul. 17, 2008.

(51) Int. Cl.
G09B 19/22 (2006.01)

(52) U.S. Cl. .................................... 434/128

(58) Field of Classification Search ............... 434/128, 434/129, 236, 262; 273/236, 242, 243, 302
See application file for complete search history.

(56) References Cited

U.S. PATENT DOCUMENTS

| | | | | |
|---|---|---|---|---|
| 4,136,879 A * | 1/1979 | Andrew et al. | ............... | 273/243 |
| 4,372,559 A * | 2/1983 | Summers | ...................... | 273/243 |
| 5,143,378 A * | 9/1992 | Joel | ............................... | 257/714 |
| 5,228,860 A * | 7/1993 | Hale | .............................. | 434/129 |
| 5,246,373 A * | 9/1993 | Becker | ........................... | 434/129 |
| 5,556,100 A * | 9/1996 | Taylor et al. | ................... | 273/249 |
| 5,722,658 A * | 3/1998 | Talmage et al. | ............... | 273/243 |
| 5,749,580 A * | 5/1998 | Lopez | ............................ | 273/243 |
| 5,931,469 A * | 8/1999 | Stichnoth | ....................... | 273/242 |
| 6,237,915 B1 * | 5/2001 | Ledet et al. | ................... | 273/236 |
| 6,669,196 B1 * | 12/2003 | Washko | ......................... | 273/243 |
| 7,507,090 B2 * | 3/2009 | Herman | ......................... | 434/128 |

* cited by examiner

*Primary Examiner* — Kurt Fernstrom
(74) *Attorney, Agent, or Firm* — Mary Christina McGill

(57) ABSTRACT

The present invention, game of chance and strategy pertaining to emergency preparedness, is a social game, based on the timely topic of disaster preparedness, providing simplification of a complex topic plus improvement and entertainment value for groups and individuals. There are two fields of play on the game surface—the outer tracks where collection of resources occurs and the inner circle—the opportunities that all participants simultaneously complete. The player or team that maximizes resources and opportunities wins. Through play conversations emerge, strategies shared, and observation occurs, opportunities to improve and practice skills applicable to emergency preparation.

16 Claims, 1 Drawing Sheet disaster drill bar (12)   inner circle (14)   outer tracks (16)

game surface (10)
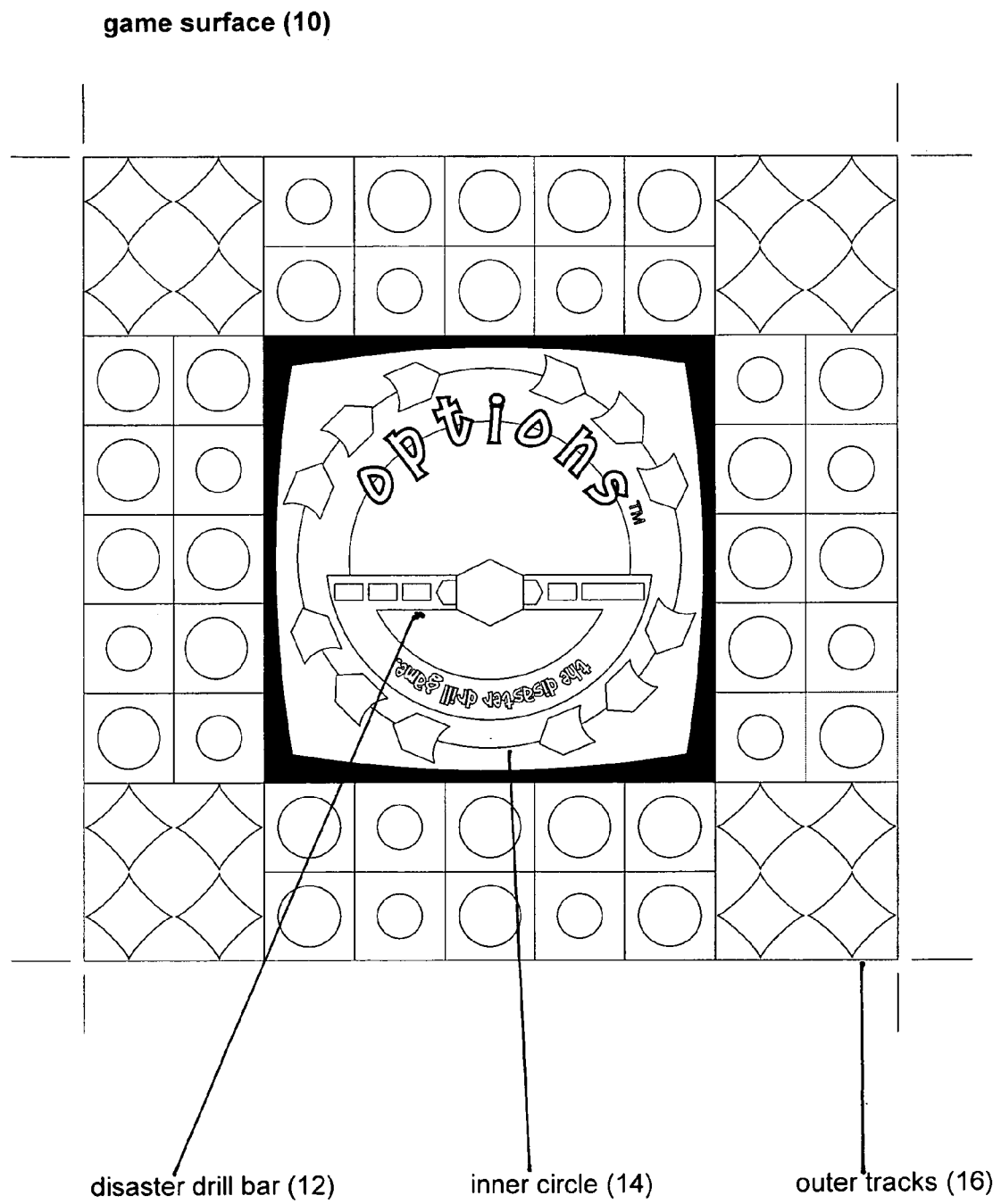
disaster drill bar (12)  inner circle (14)  outer tracks (16)

GAME OF CHANCE AND STRATEGY PERTAINING TO EMERGENCY PREPAREDNESS

A social game providing improvement and entertainment value where players or teams accumulate resources and complete activities.

CROSS-REFERENCE TO RELATED APPLICATIONS

61/135,327 filed Jul. 17, 2008

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

1. Field of Invention

An innovative amusement device. A game of chance and strategy pertaining to emergency preparedness. To be engaged by two or more participants (a plurality of players) using an original designed playing surface. Where a contest results (scoring) are indicated by defined rules of play. (instructions)

2. Discussion of Prior Art

There is a need for improvement in the self reliance of people, a need to learn the steps of being prepared and to have a disaster preparedness plan. There are web sites, infomercials, pamphlets, news articles and games that pertain to disaster preparedness. Yet a majority of the American public remains unprepared. Many know the potential threats and about advantages of preparedness. Still we fail to prepare a disaster plan. There is room for improvement in terms of groups and individuals in the area of disaster preparedness. There is a need for an entertaining yet educational game that encourages individuals to experience, think about, play and practice preparedness and the process of preparing. This leads to a better understanding of the scope of preparation. Through play participants find that planning is a functional part of their thinking and decision making. There is a need to practice critical thinking in times of calm, when we can think and react rationally and logically. There is a need for people to come together in groups to discuss best practices. Utilizing a game format and thinking, talking, and choosing in times of calm to create better decisions and strategies. Increased awareness of the need to plan in advance of an emergency, this is the level of prior art. Prior art has promoted awareness. When played, this thought provoking disaster preparedness game raises the motivation level to preparation to act and action. To determine our best or preferred order of operations, in advance so when needed we have it. Thus potentially reducing the time and expense of an emergency situation. Taking a proactive approach to preparedness, individuals and groups can have an element of control in uncontrollable situations including disasters.

U.S. Pat. No. 2,510,764 to Alain, 2006 Dec. 28, Emergency Preparedness Game, is a zero sum game, in order for one to win the others must lose. U.S. Pat. No. 5,695,190 to McClain, 1997 Dec. 9, method for playing board game, educates regarding geographic areas prone to earthquakes. Geographic and event specific. U.S. Pat. No. 6,565,090 to Aldridge, 2003, May 20, board game simulating ways to prevent global disasters from occurring, players prevent predetermined disasters from occurring. Natural disasters are a part of nature the need is to focus on preparing.

There is a need for an improvement and entertainment game that allows individuals to experience, think about, plan, and practice the process of preparedness. This leads to better understanding of the scope of preparation and improvement of individual and group.

OBJECT AND ADVANTAGES

Accordingly, several objects and advantages of this innovative game are that it brings people aged nine and up together for improvement and entertainment. Participants have the opportunity to improve in areas of disaster preparedness. A game combining strategy and chance in a new way, incorporating individual play and group play, the invention has simplified the complex topic of disaster preparedness. Through systematized introduction of concepts, activities and the task of gathering supplies, participants improve their ability to use the best of known information, and applied thinking related to disaster preparedness. Through play conversations emerge, strategies shared, and observation occurs, opportunities to improve skills and knowledge applicable to emergency preparation. Individuals and groups discover basic material needs and activities beneficial in minimizing the personal negative impacts that emergencies can create when unprepared. The invention accelerates learning by providing a systematized method for participants to improve their disaster preparedness plan. Exposure to and awareness of steps participants can take toward preparedness. Playing enables participants to engage in learning through play, to be open to consider how, why and what they can do prior to an emergency or disaster. Encouraging the individual to practice how they can best prepare. Through play, participants face fears, think about and make decisions in time of calm, when they can react rationally and logically; the prior art has promoted awareness, this thought provoking disaster preparedness game raises the motivation level to preparation to act and action. The foundation has been for this original and innovative game to improve while entertaining.

DESCRIPTION OF DRAWINGS

FIG. 1 game surface (top view) shows the perspective a participant will see while playing.

FIG. 2 scorecard (top view) set up into four areas, supply collection on left, and disaster drill event top right, activities on right middle and disaster drill with grand total lower right, all on one page.

REFERENCE NUMERALS IN DRAWINGS

| | |
|---|---|
| 10 | game surface |
| 12 | disaster drill bar |
| 14 | inner circle |
| 16 | outer tracks |

SUMMARY

An original designed and innovative game, action oriented system of play. Offers flexible play and random outcomes, fun to play takes skill to win. Offers uncommon value, centered about the creative simplification of the timely complex topic of emergency preparedness. A social game of chance and strategy pertaining to disaster preparedness providing improvement and entertainment value for groups and individuals where players or teams accumulate resources and complete activities. The winner is the individual player or team who maximizes resources and opportunities.

DESCRIPTION OF INVENTION

Game of chance and strategy pertaining to emergency preparedness, in present form, a game surface 10 (FIG. 1) of a predetermined size printed with a plurality of spaces, the outer tracks 16, around the perimeter each space has a supply printed on it. There is a second field of play an inner circle 14 with a plurality of spaces:

| | |
|---|---|
| 14a | start |
| 14b | plan ahead |
| 14c | help others plan |
| 14d | tune up |
| 14e | organize contacts |
| 14f | find shelter |
| 14g | rotate supplies |
| 14h | learn first aid |
| 14i | tell a tale |
| 14j | trade supply item |
| 14k | donate supply item |
| 14l | check supplies |

At the center is the Disaster Drill bar 12 this too has a plurality of spaces:

| | |
|---|---|
| 12a | disaster drill space |
| 12b | go |
| 12c | stay |
| 12d | cash |
| 12e | transportation |
| 12f | bonus |
| 12g | food |
| 12h | help |

Additional items include: A scorecard (FIG. 2) and detailed instructions with diagram and tables A and B that determine play of the game, six player stones, a pair of six sided dice, a gem marker to mark current activity for inner circle 14 play.

It is understood that while certain forms of the present invention have been illustrated and described herein, it is not to be limited to the specific forms or arrangements of parts described and shown.

Further, virtual versions of the game system are also considered to fall within the scope of this present invention. The virtual versions may be accomplished through software, firmware, or hard coding with a variety input and output solutions to provide entertainment and education for the users. The virtual versions of the game system adhere to the same method of play as in the non-virtual game system.

OPERATION OF INVENTION

Components game surface, dice, marker, player pieces, scorecard/supply lists Preparation & Start First, orient yourself to the layout of the game surface (see FIG. 1)—supplies are located on the two outer tracks and activities are located on the inner circle.

Place activities marker at start portal located in the activities area.

Each of the 2-6 players take a scorecard and pencil.

Each player or team chooses an individual player piece and places it on any supply item and marks the item on their supply list by circling the point value to the left of the item. (see FIG. 2)

Choose a player to roll first.

This is a multitasking game with two points of action on the game Surface: Supplies—where players use their player piece and two dice to accumulate a personal cache of disaster supplies from a plurality of available options marking their supply list appropriately; and Activities—the center area where all players simultaneously complete activities using one die and the marker to mark the current activity.

Allow approximately 60-90 minutes.

Supplies & Scorecard

Supplies are provisions including various tools, food and resources. Players acquire a supply by landing on any of the plurality of spaces. i.e. books, can opener, radio, etc. Players are free to optimize their supplies collection using the corner squares to move at right angles utilizing both tracks.

Players take turns clockwise around the game surface rolling two (2) dice and moving the rolled amount clockwise to collect supplies. Supplies have various point levels as indicated to the left of each item on the scorecard (see FIG. 2). As players land on the supply options, players will note the supply acquired by circling the corresponding point value.

Supplies are worth points that will be calculated at the end of the game and added to the total score. When a player lands on a space where the supply is already marked on their individual scorecard, play continues to the next player by passing dice to the player to your left.

Players will continue to collect supplies and complete activities until the Marker lands at "Check Supplies" and players complete this final activity. Note—supplies can be lost during the game and particular supplies and combinations of supplies have the potential to yield additional points at the final calculation of points. These possibilities are noted throughout the "Instructions for Play".

Dice Options: With Dice Options, players are eligible for additional choices in the collecting of supplies. To activate Dice Options, a player must roll doubles. The first time a player rolls doubles, the player is awarded Dice Options. Dice Options gives a player the choice to move their playing piece the number of spaces on either die or both dice combined. For every move in the collection of supplies from this point forward, when the player rolls, they may move their playing piece the number of spaces on either die or both dice combined. Also, each time a player rolls doubles, the Marker is moved to the next space on the activities area of the game surface.

Activities & Scorecard

Activities take place within the center area where there are a plurality spaces plus the Disaster Drill bar. The Marker is to be moved around the inner circle of the game surface advancing each time a player rolls doubles. All players are to complete the activity associated with the space occupied. For example, the first player to roll both dice having the same number (doubles) triggers the Marker to move to the first activity—"Plan Ahead" on the inner circle of the game surface. Instructions for completing the activity and acquiring points are listed in "Chart A" below. As any player rolls doubles, the Marker should be advanced to the next activity on the circle by the player who rolled doubles. All players are to complete the activity associated with the space occupied. See Chart A for activity instructions. As individual activities are completed, the player who rolled doubles passes the dice to the player on their left to resume the collection of supplies. When all players have completed the last and final activity within the circle (Check Supplies), all play moves to the center of the game surface—the DISASTER DRILL event is revealed, and the player points are scored & calculated.

Chart A

Start—Marker moves to "Plan Ahead" to complete the 1st activity when a player rolls doubles.

Plan Ahead—Each player rolls to determine whether or not they have made a personal disaster plan for each of six (6) disasters. Each player will roll one die 6 times to determine whether they have a preparation plan for each of the 6 disaster drill events. An odd roll (1, 3, 5) indicates the player has a preparation plan as indicated by a check mark (✓) on the scorecard. An even roll (2, 4, 6) indicates the player has no preparation plan as indicated by a dash (-) on the scorecard.

Help Others Plan—Each player rolls to determine whether or not they have helped others plan for each of six (6) disasters. Just like "Plan Ahead", each player will roll one die 6 times to determine whether they have a preparation plan for each of the 6 disaster drill events. An odd roll (1, 3, 5) indicates the player has a preparation plan as indicated by a check mark (✓) on the scorecard. An even roll (2, 4, 6) indicates the player has no preparation plan as indicated by a dash (-) on the scorecard.

Tune Up—Each player develops a list of song titles. Players may apply 25 points to their scorecard for listing three (3) and singing one.

Organize Contacts—Each player rolls one die to determine whether or not their address book is up to date. Players may apply 25 points to the scorecard in this category for rolling a 1, 3 or 5 (odd roll).

Find Shelter—Each player rolls one die to determine whether or not they have procured an alternative shelter. Players may apply 25 points to the scorecard in this category for rolling a 1, 3 or 5 (odd roll).

Rotate Supplies—Each player to roll one die up to 7 times—one for each supply listed below and checked on their individual supply list to determine whether or not the food is fresh. Players may keep individual food supplies when rolling a 1, 3 or 5 (odd roll) and will erase (lose) any supplies previously acquired when rolling a 2, 4, or 6 (even roll). Expiration dates may apply to: •Bread & Crackers •Canned Meat & Fish •Cereal & Cookies •Dried Fruit & Nuts •Meals Ready to Eat •Peanut Butter •Water Learn First Aid—Each player rolls one die to determine whether or not they have completed first aid training classes. Players may apply 25 points to the scorecard in this category for rolling a 1, 3 or 5 (odd roll).

Tell a Tale—Each player develops a short story or a poem. In your fiction or non fiction story include 3 characters and a positive outcome. Players may apply 25 points to their scorecard for telling the story to the group.

Trade Supply Item (optional)—Each player has an option to trade a supply item with another player. To determine the item eligible for trade, each player rolls one die and moves their player piece backward or forward the number of spaces rolled. It is not a requirement that a trade takes place. If a new supply was acquired, player will advance their piece to that location. All players will then make a notation of the changes made on their supply list.

Donate Supply Item—Each player moves their player piece to the closest supply "Cash" or "Clothing". If already circled on their individual supply list, the player is eligible to donate the item and may reward themselves with 25 points on the scorecard for this category. It the item is not already circled, the player is not eligible to donate; however, the player may circle it now.

Check Supplies—This is a two part task where player rolls one die to determine whether or not supplies are in a safe place. A 1, 3 or 5 (odd roll) indicates the supplies are safe and no further action is required. However, an even roll (2, 4 or 6) indicates the player must check applicable supplies by rolling one die up to 5 times—one for each supply listed below and marked on the individual supply list to determine whether or not the supply is available for emergency use. Players may keep individual supplies when rolling a 1, 3 or 5 (odd roll) and will erase (lose) any marked supplies when rolling a 2, 4, or 6 (even roll). This may apply to: •Bucket w/ lid •Cash •Disposable towels •First aid kit •Garbage bags Immediately following completion of this activity—the last player to roll doubles places the Marker on the Disaster Drill space located at the center of the game surface.

Disaster Drill

The Marker occupying this space signifies it is time for the last player who rolled doubles to roll one die to determine the DISASTER DRILL EVENT for this game. The number shown on the die corresponds with the event as listed: 1=FLOOD; 2=HURRICANE; 3=BLIZZARD; 4=EARTHQUAKE; 5=TORNADO; 6=BLACKOUT Players will make a notation of the DISASTER DRILL EVENT with a check mark on the scorecard. (Located at the top of score sheet.)

Players who have a plan (as indicated by a check mark made earlier in the game during the "Plan Ahead" activity) which corresponds with the type of disaster revealed in the DISASTER DRILL segment of the game will reward themselves with 50 points and by marking their scorecard accordingly.

Players who have helped others plan (as indicated by a check mark made earlier in the game during the "Help Others Plan" activity) which corresponds with the type of disaster revealed in the DISASTER DRILL segment of the game will reward themselves with 25 points and by marking their scorecard accordingly.

At this time, play ends for accumulating supplies. From this point, players will no longer use their individual playing piece. The remainder of the Disaster Drill bar will be used to move through the calculation of points and scoring. See Chart B.

Calculation of Points & Scoring

When the disaster is a flood or hurricane, follow the column for GO instructions on Chart B and the Disaster Drill Bar to calculate points and determine the winner.

When the disaster is a blizzard, earthquake, tornado or blackout, follow the column for STAY instructions on Chart B and the Disaster Drill Bar to calculate points and determine the winner.

Chart B

Roll 1 or 2, Flood or Hurricane

"Go" Instructions

Cash: Each player rolls one die to determine if they have adequate cash. Players may apply a check mark to the scorecard in this category for rolling a 1, 3 or 5 (odd roll). Players completing this task are rewarded with 100 points.

Transportation: Each player rolls one die to determine whether they will be using private or public transportation to evacuate. A 1, 3 or 5 (odd roll) indicates private transportation which allows for up to 10 supplies to be taken along. A 2, 4 or 6 (even roll) indicates public transportation will be used which allows for up to 3 supplies to be taken along. Circle the supplies to be taken.

Count the supply points by 10's, 5's and 2's. Add up the points for the SUPPLIES circled plus the SCORECARD points. The winner is the player with the most points.
OR
Roll 3 or 4 or 5 or 6, Blizzard or Earthquake or Tornado or Blackout
"Stay" Instructions
Bonus: For having collected particular supplies corresponding with the disaster event as follows:
Blizzard: Craft project+Foul weather gear+Hat & gloves
Earthquake: Bedding & pillows+Hard candy+Tent, tarp & rope
Tornado: Insurance policies & will+Photo album+Tools
Blackout: Flashlight+Games & cards+Generator
Player is rewarded with 50 points to be indicated on STAY: Bonus Food: Each player checks their supplies for adequate food. For having accumulated any 3 of the following supplies:
•Bread & crackers •Canned meat & fish •Cereal & cookies •Dried fruit & nuts Weals ready to eat •Peanut butter Players may apply 50 points to be indicated on STAY: Food.

Help: Each player checks for the following supplies on their lists: •Bread & crackers •First aid kit •Water
Players may apply 50 points to their scorecard in the category STAY: Help for having accumulated all 3 of the supplies listed. Players who do not have these supplies marked on their supply list may acquire them through the Help Desk now by circling the appropriate value on the supply list.
Final Scoring
Count supply totals by 10's, 5's and 2's for application to the scorecard. Add up the SUPPLIES circled plus the SCORECARD points. The winner is the player with the most points.

DRAWINGS

FIG. 1: game surface
FIG. 2: scorecard

It is understood that while certain forms of the present invention have been illustrated and described herein, it is not to be limited to the specific forms or arrangements of parts described and shown.

Further, virtual versions of the game system are also considered to fall within the scope of this present invention. The virtual versions may be accomplished through software, firmware, or hard coding with a variety input and output solutions to provide entertainment and education for the users. The virtual versions of the game system adhere to the same method of play as in the non-virtual game system.

CONCLUSION, RAMIFICATIONS, AND SCOPE OF INVENTION

The invention game of chance and strategy pertaining to emergency preparedness, provides a means for improvement and entertainment based on the timely topic of disaster preparedness.

While my above description contains many specificities, these should not be construed as limitations on the scope of the invention, but rather as an exemplification of one preferred embodiment there of, many other variations are possible, for example it could be placed or printed on surface and attached, glued, pasted or in some way affixed to a traditional chip board, game board type and boxed. Alterations of size, color, materials etc. Another variation could be broadcasted over television, radio, conference call, screen, internet, video conference or a virtual means of playing.

Accordingly, the scope of my invention, game of chance and strategy pertaining to emergency preparedness, should be determined not by the embodiments illustrated, but by appended claims and their legal equivalents.

I claim:

1. An educational game to teach emergency preparedness for a plurality of players comprising:
  a game surface having two areas of play;
  said game surface comprising a first area comprising a plurality of outer tracks, each outer track comprising a plurality of spaces, each space bearing indicia representing a supply;
  said game surface comprising a second area comprising an inner circle with a plurality of spaces, each space bearing indicia representing an activity to be completed;
  a plurality of player pieces disposed on the outer tracks and movable along the spaces of the outer tracks, where each player or team is represented by one of the player pieces;
  a marker disposed on the inner circle and movable along the spaces of the inner circle;
  a means for randomly determining a number; and
  a scorecard.

2. The emergency preparedness game of claim 1 wherein the supplies represented by the plurality of spaces on the outer tracks are provisions including tools, food and resources.

3. The emergency preparedness game of claim 1 wherein said scorecard comprises a plurality of areas including a supply list, a Disaster Drill Event, Activities and a Disaster Drill.

4. The emergency preparedness game of claim 1 wherein the means for randomly determining a number comprises a set of dice, where the marker is moved around the inner circle advancing each time a player rolls doubles, and the player piece of the player rolling the dice is moved around the outer tracks.

5. The emergency preparedness game of claim 1 wherein each of the outer tracks comprises a plurality of spaces for the gathering of supplies and wherein at each corner the player piece can move between tracks.

6. The emergency preparedness game of claim 1 wherein the scorecard comprises an area for awarding or subtracting points based on supplies and combinations of the supplies acquired by a player during game play.

7. The disaster preparedness game of claim 1 further comprising; a set of instructions with a plurality of rules and the instructions defining the rules of play.

8. The emergency preparedness game of claim 1 wherein said spaces of the inner circle comprise each of the following indicia: Start, Plan Ahead, Help Others Plan, Tune Up, Organize Contacts, Find Shelter, Rotate Supplies, Learn First Aid, Tell a Tale, Trade Supply Item, Donate Supply Item and Check Supplies.

9. The emergency preparedness game of claim 1 wherein said second area of the game surface further comprises a Disaster Drill Bar having a plurality of spaces, each space bearing indicia, where the indicia comprise: Disaster Drill, Go, Stay, Cash, Transportation, Bonus, Food and Help.

10. The emergency preparedness game of claim 1 wherein the scorecard comprises an area for denoting a specific Disaster Drill Event selected from among flood, hurricane, blizzard, earthquake, tornado, and blackout, where the type of Disaster Drill Event is determined by the means for randomly determining a number.

11. The emergency preparedness game of claim 1 wherein the supply indicia disposed on the outer tracks and the activity indicia disposed on the inner circle relate to emergency planning and preparedness;

the scorecard comprises a plurality of areas including a supply list, a Disaster Drill Event, Activities and a Disaster Drill;

where said scorecard is configured to keep track of points awarded when players collect the supplies, complete the activities and move through final scoring on the Disaster Drill Bar;

the scorecard comprises indicia which corresponds to indicia on the game surface; and the game further comprises a set of instructions with a plurality of game rules defining rules of play.

12. A method for playing an emergency preparedness game comprising the steps of:

providing a game surface having two areas of play;

said game surface comprising a first area comprising a plurality of outer tracks, each outer track comprising a plurality of spaces, each space bearing indicia representing a supply to be collected;

said game surface comprising a second area comprising an inner circle with a plurality of spaces, each space bearing indicia representing an activity to be completed;

said second area further comprising a Disaster Drill Bar having a plurality of spaces, each space bearing indicia;

providing a plurality of player pieces to be disposed on the outer tracks and movable along and throughout the spaces of the outer tracks, where each player or team is represented by one of the player pieces;

providing a marker to be disposed on the inner circle and movable along the spaces of the inner circle;

providing a means for randomly determining a number;

providing a scorecard having indicia corresponding to the indicia on the game surface;

providing a set of instructions;

assembling a plurality of players;

placing said marker at said start space in said inner circle;

placing said plurality of player pieces on said outer tracks of the game surface, wherein each player in turn generates a random number using the means for randomly determining a number and moves a player piece the corresponding number of spaces along the outer tracks and if doubles are rolled moves the marker to the next space along the inner circle;

wherein when the player piece is moved along the outer tracks the player collects supplies as indicated on the corresponding space, wherein when the marker is moved along the inner circle all players complete the activity indicated on the corresponding space of the inner circle in accordance with the instructions, tracking the collection of supplies and completion of the activities on the scorecard and awarding or subtracting points for the collection of supplies and completion of the activities in accordance with the instructions; and determining a winner at the end of the game based on the total points of each player.

13. The method for playing an emergency preparedness game of claim 12 wherein the outer tracks comprise a plurality of spaces for the gathering of supplies and wherein at each corner the player piece can move between tracks.

14. The method for playing an emergency preparedness game of claim 12 wherein the means for randomly determining a number comprises a set of dice, wherein players take turns around the game surface rolling the dice and moving the rolled amount to collect the supplies, and wherein by rolling doubles a player is awarded Dice Options, said Dice Options giving a player the choice to move their playing piece the number of spaces on either of the dice or both said dice combined, such that for every move in collection of the supplies from this point forward the player has Dice Options and wherein the marker also is to be moved around the inner circle of the game surface advancing to the next of the activities each time a player rolls doubles by the player who rolled doubles.

15. The method for playing an emergency preparedness game of claim 12 wherein play alternates between collecting the supplies at the outer tracks and completing the activities at the inner circle until the marker lands at a Check Supplies space.

16. The method for playing an emergency preparedness game of claim 12 wherein when all players have completed all of the of the activities within the inner circle all play is moved to the center of the game surface, a Disaster Drill Event is revealed using the means for randomly generating a number and the marker is moved through the Disaster Drill Bar where points are awarded and calculated.

* * * * *

UNITED STATES PATENT AND TRADEMARK OFFICE
CERTIFICATE OF CORRECTION

| | | |
|---|---|---|
| PATENT NO. | : 8,137,104 B1 | Page 1 of 1 |
| APPLICATION NO. | : 12/460109 | |
| DATED | : March 20, 2012 | |
| INVENTOR(S) | : Mary Christina McGill | |

It is certified that error appears in the above-identified patent and that said Letters Patent is hereby corrected as shown below:

Title Page

Assignee: McGill; Mary Christina (Arcadia, "MA")

Should read:

Assignee: McGill, Mary Christina (Arcadia, --MO--)

Signed and Sealed this

Eighteenth Day of August, 2015

Michelle K. Lee
*Director of the United States Patent and Trademark Office*